United States Patent
Fukuoka et al.

(10) Patent No.: US 9,484,159 B2
(45) Date of Patent: Nov. 1, 2016

(54) SILICON OXIDE MATERIAL, MAKING METHOD, NEGATIVE ELECTRODE, LITHIUM ION SECONDARY BATTERY, AND ELECTROCHEMICAL CAPACITOR

(71) Applicant: Shin-Etsu Chemical Co., Ltd., Tokyo (JP)

(72) Inventors: Hirofumi Fukuoka, Annaka (JP); Mitsugu Saito, Annaka (JP); Susumu Ueno, Annaka (JP); Tetsuya Inukai, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 225 days.

(21) Appl. No.: 14/100,513

(22) Filed: Dec. 9, 2013

(65) Prior Publication Data

US 2014/0162123 A1 Jun. 12, 2014

(30) Foreign Application Priority Data

Dec. 10, 2012 (JP) ................. 2012-269532

(51) Int. Cl.
| | |
|---|---|
| *H01M 4/134* | (2010.01) |
| *H01G 11/50* | (2013.01) |
| *H01M 4/52* | (2010.01) |
| *H01M 4/48* | (2010.01) |
| *C01B 33/18* | (2006.01) |
| *H01G 11/04* | (2013.01) |
| *H01G 11/46* | (2013.01) |
| *H01M 4/131* | (2010.01) |

(52) U.S. Cl.
CPC ............. *H01G 11/50* (2013.01); *C01B 33/18* (2013.01); *H01G 11/04* (2013.01); *H01G 11/46* (2013.01); *H01M 4/134* (2013.01); *H01M 4/483* (2013.01); *H01M 4/52* (2013.01); *C01P 2004/61* (2013.01); *C01P 2004/62* (2013.01); *H01M 4/131* (2013.01); *Y02E 60/13* (2013.01)

(58) Field of Classification Search
CPC ..... H01G 11/46; H01G 11/50; H01M 4/483; H01M 4/134; H01M 4/52; C01B 33/18
USPC ........................................ 429/218.1
See application file for complete search history.

(56) References Cited

U.S. PATENT DOCUMENTS

| | | |
|---|---|---|
| 5,395,711 A | 3/1995 | Tahara et al. |
| 5,478,671 A | 12/1995 | Idota |
| 6,066,414 A | 5/2000 | Imoto et al. |

(Continued)

FOREIGN PATENT DOCUMENTS

| | | |
|---|---|---|
| EP | 2416410 A2 | 2/2012 |
| JP | 2997741 B2 | 1/2000 |
| JP | 3008228 B2 | 2/2000 |
| JP | 3242751 B2 | 12/2001 |

(Continued)

OTHER PUBLICATIONS

Office Action issued in the corresponding Japanese Patent Application No. 2013-237739 on Sep. 13, 2016.

*Primary Examiner* — Jonathan Jelsma

(74) *Attorney, Agent, or Firm* — Birch, Stewart, Kolasch & Birch, LLP

(57) ABSTRACT

A silicon oxide material having a cobalt content of 2-200 ppm is provided. A negative electrode is formed using the silicon oxide material as active material. A nonaqueous electrolyte secondary battery constructed using the negative electrode exhibits improved cycle performance while maintaining the high battery capacity and low volume expansion of silicon oxide.

7 Claims, 1 Drawing Sheet

(56) References Cited

U.S. PATENT DOCUMENTS

| | | | | |
|---|---|---|---|---|
| 2009/0208839 A1* | 8/2009 | Geng | ............... | B82Y 30/00 429/206 |
| 2011/0287313 A1* | 11/2011 | Fukuoka | ............ | H01G 11/04 429/188 |
| 2012/0295155 A1* | 11/2012 | Deng | ............... | H01B 1/122 429/200 |

FOREIGN PATENT DOCUMENTS

| | | | |
|---|---|---|---|
| JP | 2005-53750 | A | 3/2005 |
| JP | 3846661 | B2 | 11/2006 |
| JP | 3918311 | B2 | 5/2007 |
| JP | 2011-142021 | A | 7/2011 |
| JP | 2011192453 | A * | 9/2011 |
| JP | 2012-522351 | A | 9/2012 |

* cited by examiner

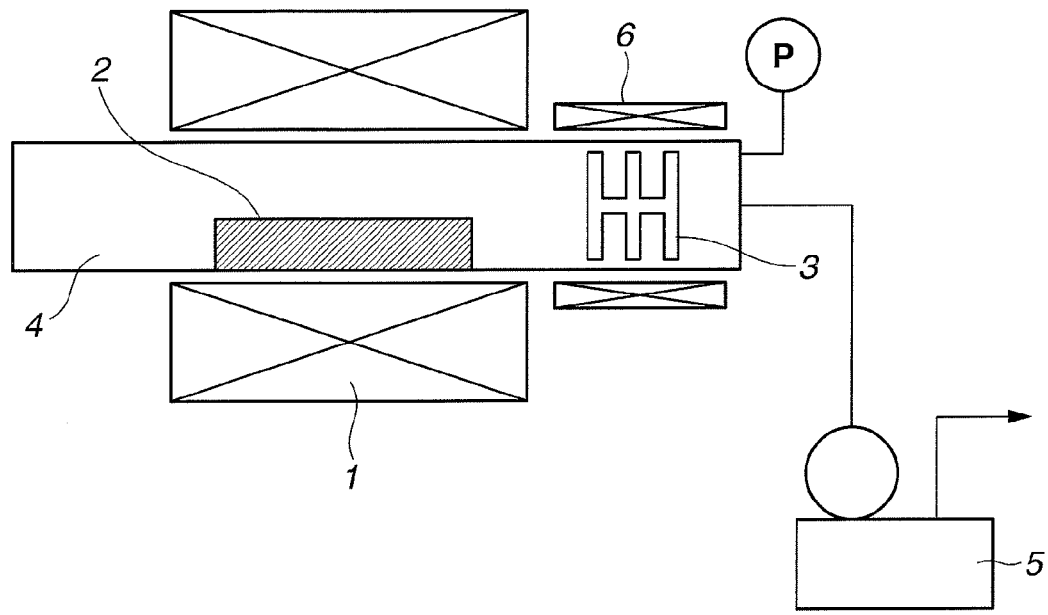

SILICON OXIDE MATERIAL, MAKING METHOD, NEGATIVE ELECTRODE, LITHIUM ION SECONDARY BATTERY, AND ELECTROCHEMICAL CAPACITOR

CROSS-REFERENCE TO RELATED APPLICATION

This non-provisional application claims priority under 35 U.S.C. §119(a) on Patent Application No. 2012-269532 filed in Japan on Dec. 10, 2012, the entire contents of which are hereby incorporated by reference.

TECHNICAL FIELD

This invention relates to a silicon oxide material and a method for preparing the same, the silicon oxide material being used as a negative electrode active material to construct a nonaqueous electrolyte secondary battery exhibiting a high capacity and improved cycle performance. It also relates to a negative electrode comprising the silicon oxide material, and a lithium ion secondary battery and electrochemical capacitor using the negative electrode.

BACKGROUND ART

In conjunction with the recent rapid advances of portable electronic equipment and communications instruments, nonaqueous electrolyte secondary batteries having a high energy density are strongly demanded from the aspects of cost, size and weight reductions. Approaches known in the art to increase the capacity of such nonaqueous electrolyte secondary batteries include, for example, use as negative electrode material of oxides of B, Ti, V, Mn, Co, Fe, Ni, Cr, Nb, and Mo and composite oxides thereof (JP 3008228 and JP 3242751); application as negative electrode material of $M_{100-x}Si_x$ wherein x≥50 at % and M=Ni, Fe, Co or Mn which is obtained by quenching from the melt (JP 3846661); use as negative electrode material of silicon oxide (JP 2997741); and use as negative electrode material of $Si_2N_2O$, $Ge_2N_2O$ or $Sn_2N_2O$ (JP 3918311).

Among others, silicon oxide is represented by $SiO_x$ wherein x is slightly greater than the theoretical value of 1 due to oxide coating, and is found on X-ray diffractometry analysis to have the structure that amorphous silicon ranging from several to several tens of nanometers is finely dispersed in silica. For this reason, silicon oxide has a battery capacity which is greater than that of currently used carbon by a factor of 5 or 6 on a weight basis, and a less volume expansion and hence, relatively good cycle performance. The silicon oxide is believed fully useful in the application to portable equipment such as mobile phones, laptop computers and tablets. However, when the automotive application is considered, the silicon oxide must overcome the problems of insufficient cycle performance and a high cost.

CITATION LIST

Patent Document 1: JP 3008228
Patent Document 2: JP 3242751
Patent Document 3: JP 3846661
Patent Document 4: JP 2997741 (U.S. Pat. No. 5,395,711)
Patent Document 5: JP 3918311
Patent Document 6: JP-A 2005-053750

SUMMARY OF INVENTION

As mentioned above, the silicon oxide active material has the outstanding problems of high cost and inferior cycle performance as compared with carbon-base active materials. Further improvements in battery characteristics are desired. An object of the invention is to provide a silicon oxide material which is used as an active material to form a negative electrode to construct a nonaqueous electrolyte secondary battery that exhibits improved cycle performance while maintaining the high battery capacity and low volume expansion of silicon oxide, and a method for preparing the silicon oxide material. Another object is to provide a negative electrode comprising the silicon oxide material, and a lithium ion secondary battery and electrochemical capacitor using the negative electrode.

Focusing on the silicon oxide material which is an active material surpassing the battery capacity of currently used carbon-base materials, the inventors made efforts to achieve improvements in battery characteristics and a cost reduction. The inventors have found that the content of a particular metal in silicon oxide material has a significant impact on battery characteristics, and that when the silicon oxide material whose metal content is limited to a specific range is used as an active material in a nonaqueous electrolyte secondary battery negative electrode material, a nonaqueous electrolyte secondary battery having a high capacity and improved cycle performance is obtained. For example, Patent Document 6 (JP-A 2005-053750) describes a cobalt catalyst, but refers nowhere to the content of a particular metal. It does not describe that the content of a particular metal has an impact on battery characteristics, or teach that the above-mentioned effects are achievable by limiting the metal content to a specific range. These findings are first discovered by the inventors.

Accordingly, the invention provides a silicon oxide material, a method for preparing the same, a negative electrode, a lithium ion secondary battery, and an electrochemical capacitor, as defined below.

In a first aspect, the invention provides a silicon oxide material for nonaqueous electrolyte secondary battery negative electrodes, having a cobalt content of 2 to 200 ppm.

The silicon oxide material is in the form of particles, preferably having an average particle size of 0.1 to 30 μm and a BET specific surface area of 0.5 to 30 m²/g.

In a second aspect, the invention provides a negative electrode for use in nonaqueous electrolyte secondary batteries, made of a negative electrode material comprising the silicon oxide material defined above.

In a third aspect, the invention provides a lithium ion secondary battery comprising the negative electrode defined above, a positive electrode, and a lithium ion-conductive nonaqueous electrolyte.

In a fourth aspect, the invention provides an electrochemical capacitor comprising the negative electrode defined above, a positive electrode, and a conductive electrolyte.

In a fifth aspect, the invention provides a method for preparing a silicon oxide material for nonaqueous electrolyte secondary battery negative electrodes, comprising the steps of heating a SiO gas-providing raw material having a cobalt content of 500 to 100,000 ppm at a temperature in the range of 1,100 to 1,600° C. under reduced pressure or in an inert gas to generate a SiO gas, and cooling the SiO gas to a temperature in the range of 500 to 1,100° C. for precipitation. Typically, the SiO gas-providing raw material is a silicon oxide powder or a mixture of a silicon dioxide powder and a metal silicon powder.

As used herein, the term "ppm" is parts by weight per million parts by weight.

Advantageous Effects of Invention

The silicon oxide material can be used as active material to form a negative electrode. A lithium ion secondary battery or electrochemical capacitor constructed using the negative electrode exhibits a high capacity and improved cycle performance. The method for preparing silicon oxide material is simple and applicable to the industrial scale manufacturing process. Thus a nonaqueous electrolyte secondary battery is constructed at a low cost.

BRIEF DESCRIPTION OF DRAWINGS

FIG. 1 schematically illustrates a horizontal tubular furnace used in the preparation of silicon oxide materials in Examples and Comparative Examples.

DESCRIPTION OF EMBODIMENTS

Silicon Oxide Material

The silicon oxide material of the invention is suited for use as a negative electrode material in nonaqueous electrolyte secondary batteries. The silicon oxide material is characterized by a cobalt (Co) content of 2 to 200 ppm. When the silicon oxide material whose Co content is limited to the specific range is used as negative electrode material, nonaqueous electrolyte secondary batteries, typically lithium ion secondary batteries having improved cycle performance can be constructed. Although the reason is not well understood, it is presumed that the inclusion of the metal in the specific range in silicon oxide particles causes a change to the crystal structure which is effective for suppressing volume changes associated with occlusion and release of Li ions and facilitating ion conduction.

If the Co content in silicon oxide material is less than 2 ppm, cycle performance is inferior, failing to obtain the above-mentioned advantages. If the Co content exceeds 200 ppm, the raw material has a larger Co content which is undesirable from the cost aspect. The Co content is preferably in the range of 3 to 180 ppm, and more preferably 5 to 170 ppm.

The Co content may be measured by the following measurement method. First 50 wt % hydrofluoric acid is added to a sample. Once reaction begins, 50 wt % nitric acid is further added. The mixture is heated at 200° C. until it is fully melted. The fluid is analyzed by ICP-AES (Agilent 730C).

Since the silicon oxide material is in particulate form, it preferably has an average particle size of 0.1 to 30 μm, more preferably 0.2 to 20 μm. Setting the average particle size of a silicon oxide material to at least 0.1 μm may prevent the material from increasing its specific surface area to increase a proportion of silicon dioxide on particle surface. This concomitantly suppresses any reduction of a cell capacity when the material is used as a nonaqueous electrolyte secondary battery negative electrode material. The setting may also prevent the material from reducing its bulk density and hence, prevent any drop of charge/discharge capacity per unit volume. In addition, such a silicon oxide material is easy to prepare and a negative electrode may be easily formed therefrom. Setting the average particle size of a silicon oxide material to at most 30 μm may prevent the material from becoming foreign particles when coated on an electrode and adversely affecting cell properties. In addition, a negative electrode may be easily formed from such a silicon oxide material, and the risk of separation from the current collector (e.g., copper foil) is minimized. It is noted that the average particle size as used herein is a particle diameter (or median diameter) corresponding to a cumulative weight of 50% in particle size distribution measurement by laser light diffractometry.

The silicon oxide particles should preferably have a BET specific surface area of 0.5 to 30 m²/g, more preferably 1 to 20 m²/g. As long as the surface area is at least 0.5 m²/g, the silicon oxide material may be provided with a sufficient surface activity to increase the bond strength of a binder during electrode fabrication. As a result, the cycle performance on repeated charge/discharge cycles is improved. A silicon oxide material with a surface area of up to 30 m²/g may prevent a proportion of silicon dioxide on particle surface from increasing and concomitantly suppress any reduction of a cell capacity when used as active material in a lithium ion secondary battery negative electrode material. In addition, the material may prevent the amount of solvent absorbed and the amount of binder used to secure a binding force from increasing during electrode fabrication, thus preventing cycle performance from declining due to a reduction of conductivity. It is noted that the BET specific surface area as used herein is a value measured by the BET single-point method of evaluating an amount of $N_2$ gas adsorbed. A BET specific surface area in the above range is obtainable by controlling such parameters as the temperature of a precipitation chamber and the concentration of silicon oxide vapor.

Method of Preparing Silicon Oxide Material

The silicon oxide material (for example, silicon oxide SiO) may be obtained, for example, by adjusting the metal content in raw material. Specifically, the desired silicon oxide material may be obtained by providing an SiO gas-providing raw material having a cobalt content of 500 to 100,000 ppm, heating the raw material at a temperature of 1,100 to 1,600° C. under reduced pressure or in an inert gas to generate a SiO gas, and cooling the SiO gas to a temperature of 500 to 1,100° C. for allowing silicon oxide particles to precipitate.

The raw material may be a silicon oxide powder or a mixture of a silicon dioxide ($SiO_2$) powder and a reducing powder. Examples of the reducing powder include metal silicon compounds and carbon-containing powders. Inter alia, a metal silicon powder is preferably used because of higher reactivity and yield. When a mixture of a silicon dioxide powder and a metal silicon powder is used as the raw material, the reaction takes place according to the following scheme.

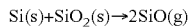

$$Si(s)+SiO_2(s) \rightarrow 2SiO(g)$$

Since the mixture of a silicon dioxide powder and a metal silicon powder ensures a high reactivity and yield, SiO gas can be generated therefrom at a high efficiency. The use of such a powder mixture as the SiO gas-providing raw material ensures preparation of a silicon oxide material which is suited as a negative electrode active material in nonaqueous electrolyte secondary batteries featuring a high capacity and improved cycle performance.

For the mixture of a silicon dioxide powder and a metal silicon powder, any suitable mixing ratio may be selected. Preferably, the metal silicon powder and the silicon dioxide powder are mixed in a ratio in the range: 1<metal silicon powder/silicon dioxide powder<1.1, and more preferably in the range: 1.01≤metal silicon powder/silicon dioxide powder≤1.08, when the presence of surface oxygen on the metal silicon powder and trace oxygen in the reactor furnace is taken into account.

Preferably the silicon dioxide powder has an average particle size of up to 0.1 μm, more preferably 0.005 to 0.1 μm, and even more preferably 0.005 to 0.08 μm. Also preferably the metal silicon powder has an average particle size of up to 30 μm, more preferably 0.05 to 30 μm, and even more preferably 0.1 to 20 μm. If the average particle size of silicon dioxide power exceeds 0.1 μm or the average particle size of metal silicon power exceeds 30 μm, reactivity may lower.

The Co content of the SiO gas-providing raw material should be in the range of 500 to 100,000 ppm, preferably 1,000 to 70,000 ppm, and more preferably 2,000 to 50,000 ppm. If the Co content of the raw material is less than 500 ppm, then the resulting silicon oxide material has a Co content of less than 2 ppm, that is, the desired silicon oxide particles are not obtainable. If the Co content of the raw material exceeds 100,000 ppm, such a high content of expensive cobalt invites a cost increase. The inclusion of cobalt in the raw material in the specific range is also effective for productivity improvement and cost reduction.

Although a raw material having a cobalt content in the specific range may be prepared by any desired methods, the following method is typically used. Although adjustment of a Co content is not particularly limited, one typical procedure is by adding a cobalt source to a SiO gas-providing raw material. Suitable cobalt sources used herein include metallic cobalt, and cobalt compounds, cobalt alloys and cobalt-containing complex oxides such as $Co_xO_y$, $CoCO_3$, $Co(OH)_2$, $Co(CH_3COO)_2$, $CoF_x$, $CoCl_2$, $CoBr_2$, $CoI_2$, $Co(NO_3)_2$, $CoSO_4$, $CoAl_2O_4$, $CoCrO_4$, $Co_2SiO_4$, $CoFe_2O_4$, $CoWO_4$, $CoTiO_3$, $CoMoO_4$, $CoS_x$, Co—Al, Co—Cu, Co—Cr, Co—Fe, Co—Ge, Co—Ir, Co—Mn, Co—Mo, Co—P, Co—Nb, Co—Ni, Co—Pd, Co—Pt, Co—Re, Co—Rh, Co—Sb, Co—Si, Co—Sm, Co—Sn, Co—Ti, Co—Te, Co—V, Co—W, Co—Y, Co—Zn, Co—Zr, and Co—Cu—Sn. Also, a metal such as Al, Cu, Cr, Fe, Ge, Ir, Mn, Mo, P, Nb, Ni, Pd, Pt, Re, Rh, Sb, Sm, Sn, Ti, Te, V, W, Y, Zn or Zr may be added as co-catalyst.

The additive used for adjustment of Co content is preferably supplied in particle form, typically having an average particle size of 0.1 to 100 μm.

The raw material is heated at a temperature in the range of 1,100 to 1,600° C. under reduced pressure or in an inert gas to generate a SiO gas. If the heating temperature is below 1,100° C., then the reaction proceeds with difficulty, to generate only a small amount of SiO gas, resulting in a very low yield. If the heating temperature exceeds 1,600° C., then the raw material (powder or powder mixture) is melted, losing reactivity, and hence, generating a reduced amount of SiO gas. In addition, the selection of a reactor furnace becomes difficult. For this reason, the heating temperature is in the range of 1,100 to 1,600° C. The heating atmosphere includes under reduced pressure, in an inert gas under atmospheric or reduced pressure. At the point of stable generating of SiO gas, reaction efficiency of silicon oxide, and yields, heating is preferably under reduced pressure. The degree of vacuum under reduced pressure is preferably 1 to 30,000 Pa. The inert gas may be argon, helium or the like.

In the next step, the SiO gas is cooled for precipitation. The steps of cooling the gas for precipitation and recovering the precipitate are not particularly limited. One exemplary step is by introducing the SiO gas into a cooling zone where a precipitate is deposited on a deposition substrate, or by spraying the SiO gas into a cooling atmosphere. Generally, the step of flowing the gas through a cooling zone where a precipitate is deposited on a deposition substrate is preferred. The type and material of the deposition substrate are not particularly limited. A substrate of a refractory metal such as stainless steel, molybdenum or tungsten is preferred for ease of working. The cooling zone should be set at a precipitation temperature of 500 to 1,100° C., preferably 600 to 1,000° C. A precipitation temperature of at least 500° C. makes it easy to prevent the reaction product from increasing its BET surface area beyond 30 m²/g. If the precipitation temperature is up to 1,100° C., any suitable material may be selected for the substrate and the precipitation apparatus may be of low cost. The temperature of the deposition substrate may be controlled by heater power, thermal insulating ability (insulating wall thickness), forced cooling, or the like.

If necessary, the precipitate (or silicon oxide material) may be ground to the desired particle size by well-known means, typically a grinding machine with classifier. Preferably, the precipitate is ground to the desired particle size by a grinding machine devoid of iron contamination. As used herein, the "grinding machine devoid of iron contamination" is a grinding machine comprising a grinding section and a contact section both made of an iron-free material. Although the iron-free material is not particularly limited, preference is given to ceramic materials including alumina, zirconia, SiAlON, silicon carbide, and silicon nitride based materials.

If the silicon oxide material is contaminated with iron, an ignition accident can occur due to shorting when the silicon oxide material is used as an active material to form a negative electrode in a nonaqueous electrolyte secondary battery, typically lithium ion secondary battery. Namely, iron contamination can cause an undesirable loss of safety.

To impart electroconductivity to the resulting silicon oxide particles, carbon may be deposited or coated thereon by chemical vapor deposition or mechanical alloying. When carbon coating is employed, the coverage (or coating weight) of carbon is preferably 1 to 50% by weight, more preferably 1 to 30% by weight based on the total weight of carbon-coated silicon oxide particles.

The chemical vapor deposition of carbon may be conducted by introducing a hydrocarbon base compound gas and/or vapor into a deposition reactor chamber at a temperature in the range of 600 to 1,200° C., preferably 800 to 1,100° C. and under atmospheric or reduced pressure, where thermal chemical vapor deposition takes place in a well-known manner. It is also acceptable to form silicon composite particles in which a silicon carbide layer is formed at the silicon-carbon layer interface. The hydrocarbon base compound used herein is thermally decomposed at the indicated temperature to form carbon. Examples of the hydrocarbon base compound include hydrocarbons such as methane, ethane, propane, butane, pentane, hexane, ethylene, propylene, butylene, and acetylene, alone or in admixture; alcohol compounds such as methanol and ethanol; mono- to tri-cyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene, alone or in admixture, and mixtures of the foregoing. Also, gas light oil, creosote oil and anthracene oil obtained from the tar distillation step are useful as well as naphtha cracked tar oil, alone or in admixture.

Negative Electrode Material

The silicon oxide particles thus obtained are effective as an active material for negative electrode material for use in nonaqueous electrolyte secondary batteries. Once a negative electrode material comprising the silicon oxide particles as active material is formulated, a negative electrode suitable for use in nonaqueous electrolyte secondary batteries may be prepared therefrom. Since the nonaqueous electrolyte secondary battery constructed using the negative electrode exerts good cycle performance while maintaining a high battery capacity and a low volume expansion inherent to silicon oxide, it is best suited in the automotive application where these properties are required.

Preferably the silicon oxide particles are present in the negative electrode (i.e., solids in the negative electrode material) in an amount of 20 to 80% by weight, more preferably 30 to 70% by weight.

While the negative electrode material contains the inventive silicon oxide particles, additives such as a conductive agent, binder and solvent may be added thereto. The type of conductive agent used herein is not particularly limited as long as it is an electronic conductive material which does not undergo decomposition or alteration in the battery. Illustrative conductive agents include metals in powder or fiber form such as Al, Ti, Fe, Ni, Cu, Zn, Ag, Sn and Si, natural graphite, synthetic graphite, various coke powders, mesophase carbon, vapor phase grown carbon fibers, pitch base carbon fibers, PAN base carbon fibers, and graphite obtained by firing various resins. Suitable binders include polyimide resins and aromatic polyimide resins. Suitable solvents include N-methylpyrrolidone and water. When such additives are compounded, preferably the conductive agent is present in an amount of 20 to 80% by weight and the binder is present in an amount of 5 to 20% by weight based on the negative electrode (i.e., solids in the negative electrode material).

Negative Electrode

The negative electrode material may be processed into a shaped body or negative electrode. For example, the negative electrode is prepared by combining the silicon oxide particles with a conductive agent (e.g., graphite), binder (e.g., polyimide resin), and other additives, as mentioned above, kneading them in a solvent (e.g., N-methylpyrrolidone or water) to form a paste-like mix, and applying the mix in sheet form to a current collector. The current collector used herein may be a foil of any material which is commonly used as the negative electrode current collector, for example, a copper or nickel foil while the thickness and surface treatment thereof are not particularly limited. The method of shaping or molding the mix into a sheet is not particularly limited, and any well-known method may be used.

Lithium Ion Secondary Battery

A further embodiment of the invention is a lithium ion secondary battery comprising at least a positive electrode, a negative electrode comprising the silicon oxide particles defined herein as active material, and a lithium ion-conducting nonaqueous electrolyte. This lithium ion secondary battery has improved battery characteristics, specifically charge/discharge capacity and cycle performance.

The lithium ion secondary battery is characterized by the use of the negative electrode material comprising the inventive silicon oxide particles as active material while the materials of the positive electrode, electrolyte, and separator and the battery design may be well-known ones and are not particularly limited. For example, the positive electrode active material used herein may be selected from transition metal oxides and chalcogen compounds such as $LiCoO_2$, $LiNiO_2$, $LiMn_2O_4$, $V_2O_5$, $MnO_2$, $TiS_2$ and $MoS_2$. The electrolytes used herein may be lithium salts such as lithium perchlorate in nonaqueous solution form. Examples of the nonaqueous solvent include propylene carbonate, ethylene carbonate, dimethoxyethane, γ-butyrolactone and 2-methyltetrahydrofuran, alone or in admixture. Use may also be made of other various nonaqueous electrolytes and solid electrolytes.

The separator disposed between positive and negative electrodes is not particularly limited as long as it is stable to the electrolyte liquid and effectively retains the liquid. Often, porous sheets or non-woven fabrics of polyolefins such as polyethylene and polypropylene, copolymers thereof, and aramide resins are used. They may be used as a single layer or a laminate of multiple layers while they may be surface covered with a layer of ceramic material such as metal oxide. Porous glass or ceramic material may also be used.

Electrochemical Capacitor

A further embodiment of the invention is an electrochemical capacitor comprising at least a positive electrode, a negative electrode, and a conductive electrolyte, the negative electrode comprising the inventive silicon oxide particles as active material. The electrochemical capacitor using the inventive silicon oxide particles as active material in its negative electrode exhibits good capacitor characteristics such as charge/discharge capacity and cycle performance. The electrochemical capacitor is characterized by the negative electrode comprising the silicon oxide active material defined herein, while other materials such as electrolyte and separator and capacitor design are not particularly limited. Examples of the electrolyte used herein include nonaqueous solutions of lithium salts such as lithium hexafluorophosphate, lithium perchlorate, lithium borofluoride, and lithium hexafluoroarsenate. Exemplary nonaqueous solvents include propylene carbonate, ethylene carbonate, dimethyl carbonate, diethyl carbonate, dimethoxyethane, γ-butyrolactone, and 2-methyltetrahydrofuran, alone or a combination of two or more. Other various nonaqueous electrolytes and solid electrolytes may also be used.

EXAMPLE

Examples of the invention are given below by way of illustration and not by way of limitation.

Example 1

A silicon oxide material was prepared using a horizontal tubular furnace as shown in FIG. 1. A reactor tube 4 of alumina having an inner diameter of 120 mm included a heating zone and a depositing zone where a deposition substrate 3 was set. The heating and depositing zones were surrounded by heaters 1 and 6, respectively.

The reactor tube 4 was charged with a raw material 2. The raw material was 100 g of a powder mixture obtained by adding 1% by weight of metallic cobalt powder having an average particle size of 8 μm to a mixture of equimolar amounts of chemical grade metal silicon powder having an average particle size of 8 μm and fumed silica ($SiO_2$) powder having an average particle size of 12 nm and a BET surface area of 200 $m^2/g$.

The reactor tube 4 was evacuated to a pressure of below 20 Pa by operating a vacuum pump 5. At the same time, the heater 1 was actuated to heat the reactor tube 4 to 1,400° C. at a rate of 300° C./hr. The reactor was held at the temperature for one hour. At this point, the heater 6 was actuated to heat and hold the deposition zone at 900° C. for the purpose of maintaining the precipitation temperature constant. Thereafter, the heaters were turned off, and the reactor tube was allowed to cool down to room temperature.

After cooling, the precipitate deposited on the substrate 3 was recovered, which was found to be a black mass and weigh 85 g. The reaction residues weighed 7.5 g (conversion rate 92.5%). The precipitate, 50 g, was dry milled in a 2-L alumina ball mill, yielding a silicon oxide powder. On measurement, the silicon oxide powder had an average particle size of 5.8 μm and a BET specific surface area of 5.2 $m^2/g$.

For assay of cobalt content, 50 wt % hydrofluoric acid was added to a powder sample. Once reaction began, 50 wt % nitric acid was further added. The mixture was heated at 200° C. until it was fully melted. The fluid was analyzed by ICP-AES (Agilent 730C), finding a cobalt content of 18 ppm.

Cell Test

The thus obtained silicon oxide powder was processed in the following way. Using the powder as a negative electrode active material, a test cell was constructed.

To the silicon oxide powder were added 45% by weight of synthetic graphite (average particle size 10 μm) and 10% by weight of polyimide. Then N-methylpyrrolidone was added to the mixture to form a slurry. The slurry was coated onto a copper foil of 12 μm thick and dried at 80° C. for one hour. Using a roller press, the coated foil was shaped under pressure into an electrode sheet. The electrode sheet was vacuum dried at 350° C. for 1 hour, after which pieces of 2 cm$^2$ were punched out as the negative electrode.

To evaluate the charge/discharge characteristics of the piece as the negative electrode, a test lithium ion secondary cell was constructed using a lithium foil as the counter electrode. The electrolyte solution used was a nonaqueous electrolyte solution of lithium hexafluorophosphate in a 1/1 (by volume) mixture of ethylene carbonate and diethyl carbonate in a concentration of 1 mol/liter. The separator used was a porous polyethylene film of 30 μm thick.

The lithium ion secondary cell thus constructed was allowed to stand overnight at room temperature. Using a secondary cell charge/discharge tester (Nagano K.K.), a charge/discharge test was carried out on the cell. Charging was conducted with a constant current flow of 0.5 mA/cm$^2$ until the voltage of the test cell reached 0 V, and after reaching 0 V, continued with a reduced current flow so that the cell voltage was kept at 0 V, and terminated when the current flow decreased below 40 μA/cm$^2$. Discharging was conducted with a constant current flow of 0.5 mA/cm$^2$ and terminated when the cell voltage exceeded 2.0 V, from which a discharging capacity was determined.

By repeating the above operation, the charge/discharge test was carried out 50 cycles on the lithium ion secondary cell. A discharging capacity after 50 cycles was determined. The lithium ion secondary cell exhibited a high capacity and excellent cycle performance as demonstrated by a 1st cycle charging capacity of 1,320 mAh/g, a 1st cycle discharging capacity of 1,010 mAh/g, a 1st cycle efficiency of 76.5%, a 50th cycle discharging capacity of 980 mAh/g, and a 50-cycle retentivity of 97%. Notably, the 50-cycle retentivity is a percentage of 50th cycle discharging capacity divided by 1st cycle discharging capacity.

Example 2

Silicon oxide particles were prepared by the same procedure as in Example 1 except that the amount of metallic cobalt added was 700 ppm. As in Example 1, the physical properties and cell properties of the silicon oxide material were evaluated. The precipitate was a black mass and weighed 82 g. The reaction residues weighed 10.3 g (conversion rate 89.7%). The precipitate, 50 g, was dry milled in a 2-L alumina ball mill, yielding a silicon oxide powder. On analysis, the silicon oxide powder had an average particle size of 5.8 μm, a BET specific surface area of 5.1 m$^2$/g, and a cobalt content of 3 ppm. The lithium ion secondary cell exhibited a high capacity and excellent cycle performance as demonstrated by a 1st cycle charging capacity of 1,300 mAh/g, a 1st cycle discharging capacity of 1,000 mAh/g, a 1st cycle efficiency of 76.9%, a 50th cycle discharging capacity of 960 mAh/g, and a 50-cycle retentivity of 96%.

Example 3

Silicon oxide particles were prepared by the same procedure as in Example 1 except that the amount of metallic cobalt added was 8 wt %. As in Example 1, the physical properties and cell properties of the silicon oxide material were evaluated. The precipitate was a black mass and weighed 79 g. The reaction residues weighed 12.8 g (conversion rate 87.2%). The precipitate, 50 g, was dry milled in a 2-L alumina ball mill, yielding a silicon oxide powder. On analysis, the silicon oxide powder had an average particle size of 5.7 μm, a BET specific surface area of 5.2 m$^2$/g, and a cobalt content of 170 ppm. The lithium ion secondary cell exhibited a high capacity and excellent cycle performance as demonstrated by a 1st cycle charging capacity of 1,290 mAh/g, a 1st cycle discharging capacity of 990 mAh/g, a 1st cycle efficiency of 76.7%, a 50th cycle discharging capacity of 950 mAh/g, and a 50-cycle retentivity of 96%.

Comparative Example 1

Silicon oxide particles were prepared by the same procedure as in Example 1 except that no metallic cobalt powder was added. As in Example 1, the physical properties and cell properties of the silicon oxide material were evaluated. The precipitate was a black mass and weighed 80 g. The reaction residues weighed 13.2 g (conversion rate 86.8%). The precipitate, 50 g, was dry milled in a 2-L alumina ball mill, yielding a silicon oxide powder. On analysis, the silicon oxide powder had an average particle size of 5.8 μm, a BET specific surface area of 5.0 m$^2$/g, and a cobalt content of 0 ppm. The lithium ion secondary cell exhibited inferior cycle performance to Examples as demonstrated by a 1st cycle charging capacity of 1,300 mAh/g, a 1st cycle discharging capacity of 990 mAh/g, a 1st cycle efficiency of 76.2%, a 50th cycle discharging capacity of 940 mAh/g, and a 50-cycle retentivity of 95%.

Comparative Example 2

Silicon oxide particles were prepared by the same procedure as in Example 1 except that the amount of metallic cobalt added was 12% by weight. As in Example 1, the physical properties and cell properties of the silicon oxide material were evaluated. The precipitate was a black mass and weighed 74 g. The reaction residues weighed 17.5 g (conversion rate 82.5%), indicating inferior reactivity to Examples. Most reaction residues contained cobalt. The amount of silicon oxide recovered was smaller than in Examples, indicating lower yields. The precipitate, 50 g, was dry milled in a 2-L alumina ball mill, yielding a silicon oxide powder. On analysis, the silicon oxide powder had an average particle size of 5.8 μm, a BET specific surface area of 5.2 m$^2$/g, and a cobalt content of 260 ppm. The lithium ion secondary cell exhibited a 1st cycle charging capacity of 1,280 mAh/g, a 1st cycle discharging capacity of 980 mAh/g, a 1st cycle efficiency of 76.6%, a 50th cycle discharging capacity of 940 mAh/g, and a 50-cycle retentivity of 96%. Although the cell characteristics were equivalent to those of Examples, this silicon oxide material was more expensive than Examples because of a higher content of expensive cobalt and less productive because of a lower yield.

Table 1 tabulates manufacturing conditions. The test results are shown in Table 2.

TABLE 1

| | | Raw material | Reaction | | Physical properties of silicon oxide particles | | |
|---|---|---|---|---|---|---|---|
| | | Co content (ppm) | Reaction residue (g) | Conversion rate (%) | Average particle size (μm) | BET surface area (m²/g) | Co content (ppm) |
| Example | 1 | 10,000 | 7.5 | 92.5 | 5.8 | 5.2 | 18 |
| | 2 | 700 | 10.3 | 89.7 | 5.8 | 5.1 | 3 |
| | 3 | 80,000 | 12.8 | 87.2 | 5.7 | 5.2 | 170 |
| Comparative Example | 1 | 0 | 13.2 | 86.8 | 5.8 | 5.0 | 0 |
| | 2 | 120,000 | 17.5 | 82.5 | 5.8 | 5.2 | 260 |

TABLE 2

| | | 1st cycle cell properties | | | 50th cycle cell properties | |
|---|---|---|---|---|---|---|
| | | Charging capacity (mAh/g) | Discharging capacity (mAh/g) | Efficiency (%) | Discharging capacity (mAh/g) | Cycle retentivity (%) |
| Example | 1 | 1,320 | 1,010 | 76.5 | 980 | 97 |
| | 2 | 1,300 | 1,000 | 76.9 | 960 | 96 |
| | 3 | 1,290 | 990 | 76.7 | 950 | 96 |
| Comparative Example | 1 | 1,300 | 990 | 76.2 | 940 | 95 |
| | 2 | 1,280 | 980 | 76.6 | 940 | 96 |

Although a particular embodiment of the invention has been described in detail for purposes of illustration, various modifications and changes may be made without departing from the spirit and scope of the invention. Accordingly, the invention is not to be limited except as by the appended claims.

Japanese Patent Application No. 2012-269532 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicon oxide material for nonaqueous electrolyte secondary battery negative electrodes, having a cobalt content of 2 to 18 ppm (parts by weight per million parts by weight).

2. The silicon oxide material of claim 1 which is in the form of particles having an average particle size of 0.1 to 30 μm and a BET specific surface area of 0.5 to 30 m²/g.

3. A negative electrode for use in nonaqueous electrolyte secondary batteries, made of a negative electrode material comprising the silicon oxide material of claim 1.

4. A lithium ion secondary battery comprising the negative electrode of claim 3, a positive electrode, and a lithium ion-conductive nonaqueous electrolyte.

5. An electrochemical capacitor comprising the negative electrode of claim 3, a positive electrode, and a conductive electrolyte.

6. A method for preparing a silicon oxide material for nonaqueous electrolyte secondary battery negative electrodes of claim 1, comprising the steps of:

heating a SiO gas-providing raw material at a temperature in the range of 1,100 to 1,600° C. under reduced pressure or in an inert gas to generate a SiO gas, said SiO gas-providing raw material having a cobalt content of 500 to 10,000 ppm, and cooling the SiO gas to a temperature in the range of 500 to 1,100° C. for precipitation.

7. The method of claim 6, wherein the SiO gas-providing raw material is a silicon oxide powder or a mixture of a silicon dioxide powder and a metal silicon powder.

* * * * *